(12) United States Patent
Frey et al.

(10) Patent No.: US 8,092,954 B2
(45) Date of Patent: Jan. 10, 2012

(54) METHOD OF MAKING A FUEL CELL POLYMER ELECTROLYTE MEMBRANE COMPRISING MANGANESE OXIDE

(75) Inventors: Matthew H. Frey, Cottage Grove, MN (US); Steven J. Hamrock, Stillwater, MN (US); Gregory M. Haugen, Edina, MN (US); Phat T. Pham, Little Canada, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/621,795

(22) Filed: Nov. 19, 2009

(65) Prior Publication Data

US 2010/0062314 A1 Mar. 11, 2010

Related U.S. Application Data

(62) Division of application No. 10/944,998, filed on Sep. 20, 2004.

(51) Int. Cl.
*H01M 8/10* (2006.01)

(52) U.S. Cl. ............ 429/495; 429/479; 429/491

(58) Field of Classification Search ............ 429/479, 429/495, 491
See application file for complete search history.

(56) References Cited

U.S. PATENT DOCUMENTS

| | | |
|---|---|---|
| 3,369,938 A | 2/1968 | Kroeger et al. |
| 3,382,105 A | 5/1968 | McBryar et al. |
| 4,021,369 A | 5/1977 | Lyons |
| 4,284,835 A | 8/1981 | Kim et al. |
| 4,340,276 A | 7/1982 | Maffitt et al. |
| 4,358,545 A | 11/1982 | Ezzell et al. |
| 4,416,801 A | 11/1983 | Waller |
| 4,433,082 A | 2/1984 | Grot |
| 4,568,598 A | 2/1986 | Bilkadi et al. |
| 4,741,744 A | 5/1988 | Wu et al. |
| 4,752,369 A | 6/1988 | Caldwell et al. |
| 4,812,352 A | 3/1989 | Debe |
| 4,824,835 A | 4/1989 | Mertens et al. |
| 4,866,099 A | 9/1989 | Hendy |
| 5,039,561 A | 8/1991 | Debe |
| 5,176,786 A | 1/1993 | Debe |
| 5,186,877 A | 2/1993 | Watanabe |
| 5,221,455 A | 6/1993 | Hanada et al. |
| 5,225,391 A | 7/1993 | Stonehart et al. |

(Continued)

FOREIGN PATENT DOCUMENTS

EP  0 459 820 B1  4/1991

(Continued)

OTHER PUBLICATIONS

A. Bonakdarpour et al., "Corrosion of Transition Metals, in $Pt_{1-x}M_x$ Proton Exchange Membrane Fuel Cell Electrocatalysts", 2004 Fall Meeting of the Electrochemical Society of Japan, Hawaii, Oct. 3-8, 2004.
G. M. Chow et al.; "Fabrication of Biologically Based Microstructure Composites for Vacuum Field Emission", Materials Science and Engineering, A158, 1992, pp. 1-6.
M. K. Debe, K. K. Kam, J. C. Liu, and R. J. Poirier, "Vacuum Vapor Deposited Thin Films of a Perylene Dicarboximide Derivative: Microstructure Versus Deposition Parameters", J. Vac. Sci. Technol. A, 6 (3), May/Jun. 1988, pp. 1907-1911.
M. K. Debe and R. J. Poirier; "Effect of Gravity on Copper Phthalocyanine Thin Films, III: Microstructure Comparisons of Copper Phthalocyanine Thin Films Grown in Microgravity and Unit Gravity", Thin Solid Films, vol. 186, 1990, pp. 327-347.

(Continued)

*Primary Examiner* — Karie O'Neil Apicella
(74) *Attorney, Agent, or Firm* — Philip Y. Dahl; Stephen L. Crooks

(57) ABSTRACT

Fuel cell membrane electrode assemblies and fuel cell polymer electrolyte membranes are provided comprising manganese oxides which demonstrate increased durability. Methods of making same are provided.

14 Claims, 2 Drawing Sheets

U.S. PATENT DOCUMENTS

| | | | |
|---|---|---|---|
| 5,294,232 | A | 3/1994 | Sakairi et al. |
| 5,336,558 | A | 8/1994 | Debe |
| 5,338,430 | A | 8/1994 | Parsonage et al. |
| 5,472,799 | A | 12/1995 | Watanabe |
| 5,523,181 | A | 6/1996 | Stonehart et al. |
| 5,766,787 | A | 6/1998 | Watanabe et al. |
| 5,766,788 | A | 6/1998 | Inoue et al. |
| 5,840,192 | A | 11/1998 | El Moussaoui et al. |
| 5,879,827 | A | 3/1999 | Debe et al. |
| 5,879,828 | A | 3/1999 | Debe et al. |
| 5,958,822 | A | 9/1999 | Beckerbauer et al. |
| 6,040,077 | A | 3/2000 | Debe et al. |
| 6,059,943 | A | 5/2000 | Murphy et al. |
| 6,156,184 | A | 12/2000 | Antonucci et al. |
| 6,242,135 | B1 | 6/2001 | Mushiake |
| 6,319,293 | B1 | 11/2001 | Debe et al. |
| 6,335,112 | B1 | 1/2002 | Asukabe et al. |
| 6,624,328 | B1 | 9/2003 | Guerra |
| 6,630,263 | B1 | 10/2003 | McElroy |
| 6,635,384 | B2 | 10/2003 | Bahar et al. |
| 6,649,295 | B2 | 11/2003 | Hamrock et al. |
| 6,680,138 | B1 | 1/2004 | Honma et al. |
| 6,864,006 | B2 | 3/2005 | Honma et al. |
| 7,220,509 | B2 | 5/2007 | Merzougui et al. |
| 2002/0004453 | A1 | 1/2002 | Haugen et al. |
| 2002/0015875 | A1 | 2/2002 | Kim |
| 2002/0058172 | A1 | 5/2002 | Datz et al. |
| 2002/0076594 | A1 | 6/2002 | Fukuda et al. |
| 2002/0093008 | A1 | 7/2002 | Kerres et al. |
| 2002/0132157 | A1 | 9/2002 | Finkelshtain et al. |
| 2003/0008196 | A1 | 1/2003 | Wessel et al. |
| 2003/0013004 | A1 | 1/2003 | Oyanagi et al. |
| 2004/0043283 | A1 | 3/2004 | Cipollini et al. |
| 2004/0048129 | A1 | 3/2004 | Taft, III et al. |
| 2004/0048466 | A1 | 3/2004 | Gore et al. |
| 2004/0053098 | A1 | 3/2004 | Schiffrin et al. |
| 2004/0116742 | A1 | 6/2004 | Guerra |
| 2004/0121210 | A1* | 6/2004 | Hamrock et al. ............ 429/33 |
| 2004/0251450 | A1 | 12/2004 | Kerres et al. |
| 2005/0069755 | A1 | 3/2005 | Vernstrom et al. |
| 2005/0136308 | A1* | 6/2005 | Andrews et al. ............ 429/30 |
| 2006/0019140 | A1 | 1/2006 | Kawazoe et al. |
| 2006/0046120 | A1 | 3/2006 | Merzougui et al. |
| 2006/0063054 | A1 | 3/2006 | Frey et al. |
| 2006/0063055 | A1 | 3/2006 | Frey et al. |
| 2006/0099475 | A1 | 5/2006 | Watanabe et al. |
| 2006/0231484 | A1 | 10/2006 | Haring et al. |
| 2007/0082814 | A1 | 4/2007 | Debe et al. |
| 2007/0099052 | A1 | 5/2007 | Frey et al. |
| 2007/0099053 | A1 | 5/2007 | Frey et al. |

FOREIGN PATENT DOCUMENTS

| | | |
|---|---|---|
| EP | 0 631 337 B1 | 7/2000 |
| EP | 1 133 806 B1 | 9/2002 |
| GB | 149233 | 1/1922 |
| GB | 1 449 233 | 9/1976 |
| GB | 1534359 | 12/1978 |
| JP | 54-82042 A2 | 6/1979 |
| JP | 2000-106203 | 4/2000 |
| JP | 2000106203 A * | 4/2000 |
| JP | 2001-118591 | 4/2001 |
| JP | 2001-321664 | 11/2001 |
| JP | 2003-059497 | 2/2003 |
| JP | 2003-123777 A2 | 4/2003 |
| JP | HEI-2003-282097 | 10/2003 |
| JP | 2004-018573 | 1/2004 |
| JP | 1 627 3384 | 9/2004 |
| KR | 2000-063843 | 6/2000 |
| WO | WO 00/24074 | 4/2000 |
| WO | WO 01/54216 A2 | 7/2001 |
| WO | WO 02/061871 A2 | 8/2002 |
| WO | WO 03/007412 A1 | 1/2003 |
| WO | WO 03/072854 A2 | 9/2003 |
| WO | WO 2005/060039 A1 | 6/2005 |

OTHER PUBLICATIONS

M. Debe, A. Steinbach, K. Lewinski, G. Haugen, G. Vernstrom, R. Atanasoski, A. Hester, P. Turner, R. Ziegler, J. Larson, M. Hicks, and P. Serim; "Activities of Low Pt Loading, Carbon-Less, Ultra-Thin Nanostructured Film-Based Electrodes for PEM Fuel Cells and Roll-Good Fabricated MEA Performances in Single Cells and Stacks", 2003 Fuel Cell Seminar, Fuel Cells for Secure, Sustainable Energy, Abstracts, Nov. 3-7, 2003, Miami Beach, Florida, Fontainebleau Hilton Hotel, pp. 812-815.

Dupont™ Nafion® PFSA Products Perfluorosulfonic Acid Polymer Technical Information; "Safe Handling and Use of Perfluorosulfonic Acid Products", Feb. 2004, pp. 1-4.

Goering et al., "Role of Ion-Exchange Membrane Morphology and Sorption Properties in Facilitated Transport di-olefin/mono-olefin Separations", Journal of Membrane Science, vol. 144, 1998, pp. 133-143.

J. Guan and G. Li, "Studies on Preparation of Ultrafine MnO Particles and Its Eletrocatalytic Performance in PEMFC", Huaxue Shijie 43 [1] (2002) pp. 7-9.

K. K. Kam, M. K. Debe, R. J. Poirier, and A. R. Drube; "Summary Abstract: Dramatic Variation of the Physical Microstructure of a Vapor Deposited Organic Thin Film", J. Vac. Sci. Technol, A, 5(4), Jul./Aug. 1987, pp. 1914-1916.

Sang-Hee Kwak, TaeHyun Yang, Chang-Soo Kim, and Ki Hyun Yoon; "Performance Evaluation of Platinum Dispersed Self-Humidifying Polymer Electrolyte Membrane Prepared by Using RF Magnetron Sputter", *Journal of the Korean Ceramic Society*, vol. 40, No. 2, 2003, pp. 118-122.

S. Kawatsu and M. Iwase, "Electrocatalysts for Polymer Electrolyte Fuel Cells", Jidosha Gijutsukai Ronbunshu (Transaction of the Society Automotive Engineers of Japan), vol. 28, No. 4, (Oct. 1997), pp. 39-42.

P. K. Lee and M. K. Debe, "Measurement and Modeling of the Reflectance-Reducing Properties of Gradient Index Microstructured Surfaces", Photographic Science and Engineering, vol. 24, (4), Jul./Aug. 1980, pp. 211-216.

Fuqiang Liu, Baolian Yi, Danmin Xing, Jingrong Yu, Zhongjun Hou, Yongzhu Fu; "Development of Novel Self-Humidifying Composite Membranes for Fuel Cells", *Journal of Power Sources*, vol. 124, 2003, pp. 81-89.

Mikael Ludvigsson, Jon Lindgren, and Jorgen Tegenfeldt; "Incorporaton and Characterisation of Oxides of Manganese, Cobalt, and Lithium Into Nafion 117 Membranes", Journal Materials Chemistry, vol. 11, Feb. 15, 2001, pp. 1269-1276.

A. Michas, J. M. Kelly, R. Durand, M. Pineri, and J.M.D. Coey; "Preparation, Characterization and Catalytic Properties of Perfluorosulfonated Ion-Exchange Membranes Containing Surface-Concentrated, Hydrated Ruthenium Oxide Particles"; Journal of Membrane Science, Elsevier Science Publishers B.V., Amsterdam—Printed in The Netherlands; vol. 29, No. 3, Dec. 15, 1986, pp. 239-257.

S. Ohnuma, Y. Nakanouchi, and T. Masumoto; "Amorphous Ultrafine Metallic Particles Prepared by Sputtering Method", Rapidly Quenched Metals, Proc. of the Fifth Int. Conf. on Rapidly Quenched Metals, Wurzburg, Germany, Sep. 3-7, 1984, S. Steeb et al., eds., Elsevier Science Publisher B.V., New York, 1985, pp. 1117-1124.

Y. Sadaoka, T. A. Jones, G. S. Revell, W. Gopel; Effects of Morphology on $NO_2$ Detection in Air at Room Temperature With Phthalocyanine Thin Films, Journal of Materials Science, vol. 25, 1990, pp. 5257-5268.

H. Tang, J. H. Chen, Z. P. Huang, D. Z. Wang, Z. F. Ren, L. H. Nie, Y. F. Kuang, and S. Z. Yao; "High Dispersion and Electrocatalytic Properties of Platinum on Well-Aligned Carbon Nanotube Arrays", Carbon, vol. 42, 2004, pp. 191-197.

* cited by examiner

US 8,092,954 B2

METHOD OF MAKING A FUEL CELL POLYMER ELECTROLYTE MEMBRANE COMPRISING MANGANESE OXIDE

CROSS REFERENCE TO RELATED APPLICATIONS

This application is a divisional of U.S. Ser. No. 10/944,998, filed Sep. 20, 2004, now pending, the disclosure of which is incorporated by reference in its entirety herein.

This invention was made with Government support under Cooperative Agreement DE-FC36-02AL67621 awarded by DOE. The government has certain rights in this invention.

FIELD OF THE INVENTION

This invention relates to fuel cell membrane electrode assemblies and fuel cell polymer electrolyte membranes comprising manganese oxides which demonstrate increased durability, and methods of making same.

BACKGROUND OF THE INVENTION

Ludvigson, J. Mater. Chem., 11 (2001) 1269-1276; Michas, J. Membrane Sci., 29 (1986) 239-257 and Japanese Kokai 2001/118591 (Morimoto) purportedly disclose polymer electrolyte membranes made by a method generally described as immersion of a membrane in a solution of a metal salt followed by oxidization to convert the metal salts into metal oxides in the finished product. Ludvigson and Michas discuss the resulting distribution of metal oxides in the finished product. The metals include Mn (in Ludvigson) and Ru (in Michas and Morimoto).

U.S. Pat. No. 6,335,112 (Asukabe) purportedly discloses a polymer electrolyte membrane comprising a hydrocarbon-based solid polymer electrolyte which contains a catalyst, which may be one of several catalysts including $MnO_2$.

Copolymers of tetrafluoroethylene (TFE) and a co-monomer according to the formula: $FSO_2$—$CF_2$—$CF_2$—O—CF($CF_3$)—$CF_2$—O—CF=$CF_2$ are known and sold in sulfonic acid form, i.e., with the $FSO_2$— end group hydrolyzed to $HSO_3$—, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2$—$CF_2$—$CF_2$—O—CF=$CF_2$ are known and used in sulfonic acid form, i.e., with the $FSO_2$— end group hydrolyzed to $HSO_3$—, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendant groups according to the formula:

$YOSO_2$—$CF_2$—$CF_2$—$CF_2$—$CF_2$—O—[polymer backbone]

where Y is $H^+$ or a monovalent cation such as an alkali metal cation. Typically, the membrane is a cast membrane. Typically, the polymer has a hydration product of greater than 22,000. Typically, the polymer has an equivalent weight of 800-1200.

SUMMARY OF THE INVENTION

Briefly, the present invention provides a fuel cell membrane electrode assembly comprising a polymer electrolyte membrane which comprises a highly fluorinated polymer electrolyte and at least one manganese oxide, wherein the distribution of the manganese oxide across the thickness of the polymer electrolyte membrane is uniform. Typically, the highly fluorinated polymer electrolyte is perfluorinated. Typically the manganese oxide is present in an amount of between 0.01 and 5 weight percent relative to the total weight of the polymer electrolyte membrane; more typically between 0.1 and 1 weight percent and most typically between 0.2 and 0.3 weight percent. The manganese oxide may be $MnO_2$. The manganese oxide may be $Mn_2O_3$. Typically, the polymer electrolyte has an equivalent weight of 1000 or less, more typically 900 or less, and more typically 800 or less. The polymer electrolyte may comprise pendent groups according to the formula: —O—$CF_2$—$CF_2$—$CF_2$—$CF_2$—$SO_3H$ or according to the formula: —O—$CF_2$—CF($CF_3$)—O—$CF_2$—$CF_2$—$SO_3H$.

In another aspect, the present invention provides a method of making a fuel cell polymer electrolyte membrane comprising the steps of: a) providing a highly fluorinated polymer electrolyte comprising acidic functional groups; b) adding at least one manganese oxide in an amount so as to provide between 0.01 and 5 percent of the total weight of the polymer electrolyte membrane; and c) thereafter forming a polymer electrolyte membrane comprising said polymer electrolyte, wherein the distribution of each manganese oxide across the thickness of said polymer electrolyte membrane is uniform. Typically, the highly fluorinated polymer electrolyte is perfluorinated. Typically the manganese oxide is present in an amount of between 0.1 and 1 weight percent and most typically between 0.2 and 0.3 weight percent. The manganese oxide may be $MnO_2$. The manganese oxide may be $MnO_2O_3$. Typically, the polymer electrolyte has an equivalent weight of 1000 or less, more typically 900 or less, and more typically 800 or less. The polymer electrolyte may comprise pendent groups according to the formula: —O—$CF_2$—$CF_2$—$CF_2$—$CF_2$—$SO_3H$ or according to the formula: —O—$CF_2$—CF($CF_3$)—O—$CF_2$—$CF_2$—$SO_3H$.

In another aspect, the present invention provides a method of making a fuel cell membrane electrode assembly comprising any method herein for making a polymer electrolyte membrane, and additionally comprising the step of: d) forming a membrane electrode assembly comprising that polymer electrolyte membrane.

In this application:

"uniform" distribution of an additive in a polymer membrane means that the amount of additive present does not vary more than +/−90%, more typically not more than +/−50% and more typically not more than +/−20%;

"equivalent weight" (EW) of a polymer means the weight of polymer which will neutralize one equivalent of base; and "highly fluorinated" means containing fluorine in an amount of 40 wt % or more, typically 50 wt % or more and more typically 60 wt % or more.

It is an advantage of the present invention to provide a fuel cell membrane electrode assembly and polymer electrolyte membrane and methods of making same which provide increased durability.

DETAILED DESCRIPTION

Figure 1:
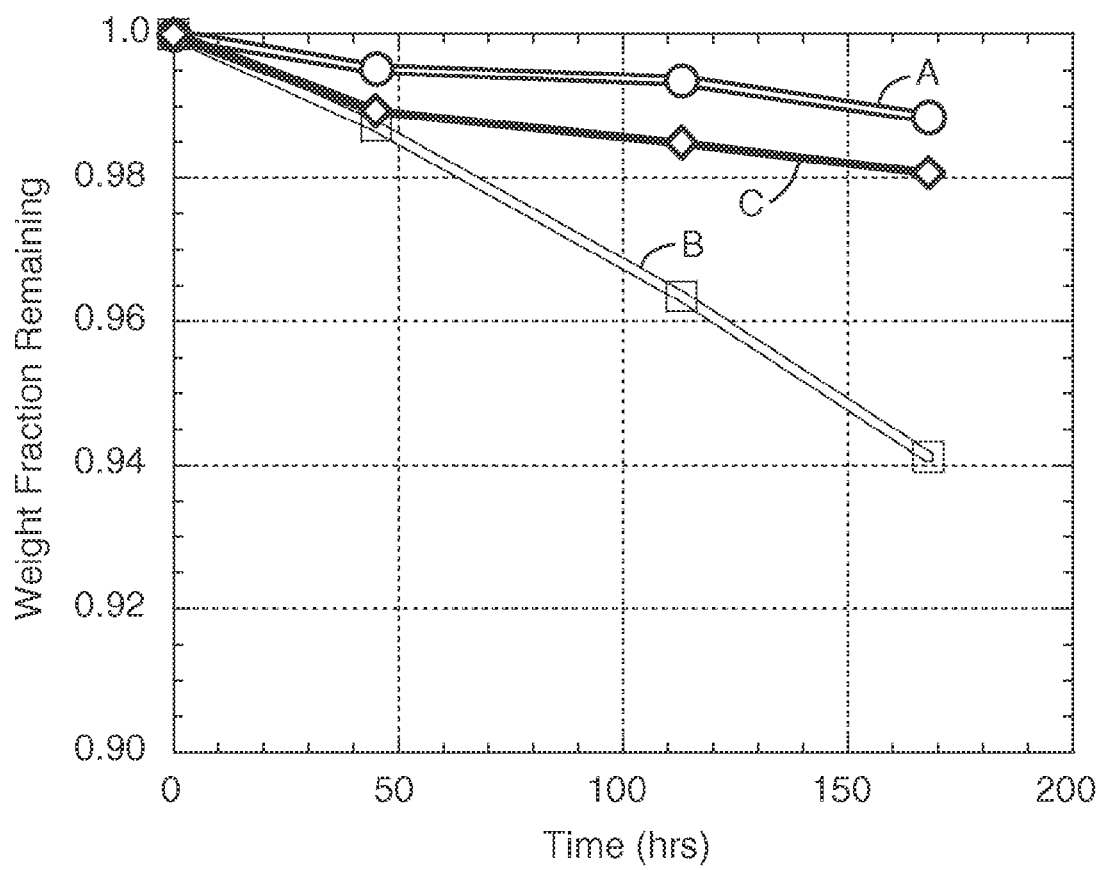
FIG. 1 is a graph of weight remaining vs. time of exposure to a peroxide solution or water for membranes according to the present invention (C) and for comparative membranes (A & B), as described in Examples 1C, 2C, and 3.

The present invention provides a fuel cell membrane electrode assembly comprising a polymer electrolyte membrane which comprises a highly fluorinated or perfluorinated polymer electrolyte and at least one manganese oxide, such as $MnO_2$ or $Mn_2O_3$, wherein the distribution of the manganese oxide across the thickness of the polymer electrolyte membrane is uniform.

The membrane electrode assembly (MEA) and polymer electrolyte membrane (PEM) according to the present invention may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are typically highly fluorinated and most typically perfluorinated. The polymer electrolytes useful in the present invention are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—CF=$CF_2$, described in U.S. patent applications Ser. Nos. 10/322,254, 10/322,226 and 10/325,278, which are incorporated herein by reference. The polymer typically has an equivalent weight (EW) of 1200 or less, more typically 1100 or less, more typically 1000 or less, more typically 900 or less, and more typically 800 or less.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns.

In one embodiment of the present invention, one or more manganese oxides, such as $MnO_2$ or $Mn_2O_3$, is added to the polymer electrolyte prior to membrane formation. Typically the oxide is mixed well with the polymer electrolyte to achieve substantially uniform distribution. Mixing is achieved by any suitable method, including milling, kneading and the like, and may occur with or without the inclusion of a solvent. The amount of oxide added is typically between 0.01 and 5 weight percent based on the total weight of the final polymer electrolyte or PEM, more typically between 0.1 and 2 wt %, and more typically between 0.2 and 0.3 wt %. Factors mitigating against inclusion of excessive manganese oxide include reduction of proton conductivity, which may become a significant factor at greater than 0.25 wt % oxide.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

In one embodiment of the present invention, the electrode or the catalyst ink comprises a polymer that comprises bound anionic functional groups and cations selected from the group consisting of manganese cations, as provided herein for polymers comprising a PEM according to the present invention. Typically, at least a portion of the anionic functional groups are in acid form and at least a portion of the anionic functional groups are neutralized by the Mn cations, as provided herein for polymers comprising a PEM according to the present invention.

To make an MEA, GDL's may be applied to either side of a CCM by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents may be available from Aldrich Chemical Co., Milwaukee, Wis., or may be synthesized by known methods.

Ionomer

Except where noted, the ionomer used in each of the following Examples is a copolymer of tetrafluoroethylene (TFE) and $FSO_2$—$CF_2CF_2CF_2CF_2$—O—CF=$CF_2$ (Comonomer A). Comonomer A was made according to the procedures disclosed in U.S. patent applications Ser. Nos. 10/322,254 and 10/322,226, incorporated herein by reference. Polymerization was performed by aqueous emulsion polymerization as described in U.S. patent application Ser. No. 10/325,278. The equivalent weight (EW) was 1000. The ionomer was provided in a casting solution containing 16.7% solids in 70:30 n-propanol/water.

Manganese Oxides

One of two different forms of manganese oxide was used in each of the following Examples. $MnO_2$ was purchased from Aldrich Chemical Company and was used as received. $Mn_2O_3$ was synthesized by precipitating a solution of manganous nitrate with ammonium hydroxide, followed by drying and calcining at 900° C.

Preparation of Stabilized Polymer Electrolyte Membranes (PEM's)

The ionomer casting solution was combined with the selected manganese oxide in an amount sufficient to provide manganese oxide loadings of 0.1, 0.25, 1.0, or 2.0 wt % manganese oxide as a percentage of total solids weight. 1 cm zirconium oxide milling media (Zircoa, Inc., Solon, Ohio) was added and the mixture was charged into a polyethylene bottle and rolled for 24 hours to disperse the manganese oxide, and thereafter separated from the milling media.

Membranes were made by casting the manganese oxide-loaded dispersions on window glass by hand-spread technique using the 0.020 inch (0.0508 cm) gap of a 4-inch multiple clearance applicator (Cat. No. PAR-5357, BYK-Gardner, Columbia, Md.). The membrane film was dried in an 80° C. oven for 10 minutes and then in a 160° C. oven for 10 minutes.

Preparation of Standard Polymer Electrolyte Membranes (PEM's)

Standard PEM's were made by the same procedure as Stabilized PEM's, except that manganese oxide and milling media were not added and the solution was not milled.

Examples 1C, 2C & 3

PEM's made with 1 wt % $Mn_2O_3$ ("stabilized") and without manganese oxide ("standard") were weighed and then soaked in 1M $H_2O_2$ at 90° C. The soaked polymer films were removed at the times indicated and weighed, after drying for at least one hour. Weight loss data for the PEM's was taken as an indication of oxidative degradation. Where weight measurements were made at intermediate times, original peroxide solutions were replaced with fresh 1M $H_2O_2$ at weighing times. For comparison, some standard PEM's were soaked in water only.

FIG. 1 demonstrates weight loss data for water-soaked standard PEM's (Example 1C, Trace A), peroxide-soaked standard PEM's (Example 2C, Trace B), and peroxide-soaked stabilized PEM's (Example 3, Trace C). Addition of small amounts of manganese oxide consistently resulted in reduced weight loss for PEM's soaked in peroxide. Less weight loss upon exposure to high-temperature peroxide solutions is taken as an indication of improved oxidative stability.

Examples 4C, 5 & 6

Figure 2:
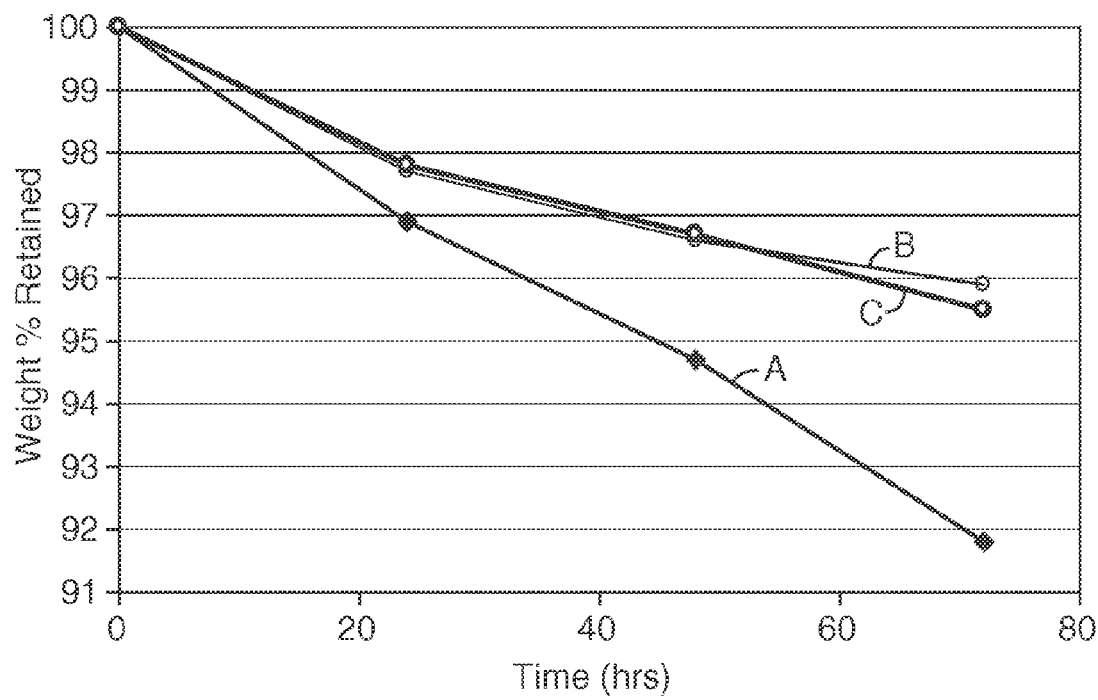
FIG. 2 is a graph of weight remaining vs. time of exposure to a peroxide solution for membranes according to the present invention (B & C) and for comparative membranes (A), as described in Examples 4C, 5, and 6.

Standard PEM's without manganese oxide (Example 4C) and stabilized PEM's made with 0.25 wt % and 1 wt % $MnO_2$ (Examples 5 and 6, respectively) were tested in peroxide as described above for Examples 1C, 2C & 3. FIG. 2 demonstrates weight loss data for the standard PEM's (Example 4C, Trace A) and stabilized PEM's (Example 5, Trace B, and Example 6, Trace C). Again, addition of small amounts of manganese oxide consistently resulted in reduced weight loss for PEM's soaked in peroxide.

Examples 7C, 8, 9 & 10

Figure 3:
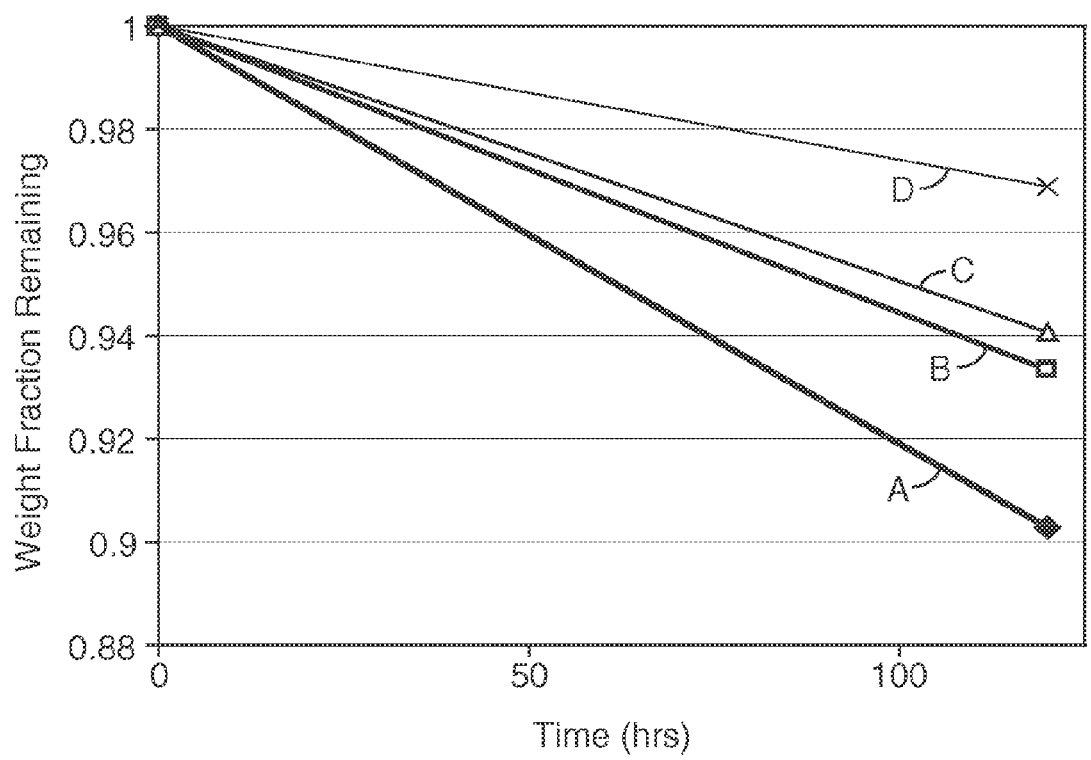
FIG. 3 is a graph of weight remaining vs. time of exposure to a peroxide solution for membranes according to the present invention (B, C & D) and for comparative membranes (A), as described in Examples 7C, 8, 9 and 10.

Standard PEM's without manganese oxide (Example 7C) and stabilized PEM's made with 0.1 wt %, 0.25 wt % and 1 wt % $MnO_2$ (Examples 8, 9 and 10, respectively) were tested in peroxide as described above for Examples 1C, 2C & 3. FIG. 3 demonstrates weight loss data for the standard PEM's (Example 7C, Trace A) and stabilized PEM's (Example 8, Trace B; Example 9, Trace C, and Example 10, Trace D). Again, addition of small amounts of manganese oxide consistently resulted in reduced weight loss for PEM's soaked in peroxide.

MEA Fabrication for Examples 11 & 12C

Fuel cell MEA's having 50 $cm^2$ of active area were prepared as follows. Catalyst dispersions were prepared according to the method described in WO 2002/061,871, incorporated herein by reference. To prepare catalyst-coated membranes, anode and cathode layers were applied to membranes according to the decal transfer method described in the same reference, WO 2002/061,871. PTFE-treated carbon paper gas diffusion layers and polytetrafluoroethylene/glass composite gaskets were applied to the CCM by pressing in a Carver Press (Fred Carver Co., Wabash, Ind.) with 13.4 kN of force at 132° C. for 10 minutes.

MEA Lifetime Test for Examples 11 & 12C

The MEA's were tested in a test station with independent controls of gas flow, pressure, relative humidity, and current or voltage (Fuel Cell Technologies, Albuquerque, N.Mex.). The test fixture included graphite current collector plates with quad-serpentine flow fields. MEA's were operated with $H_2$/air under subsaturated conditions at 90° C. with anode overpressure. The MEA's were subjected to an accelerated load cycle lifetime test by imposition of a variety of current density values. After each load cycle, the open circuit voltage (OCV) of the cell was measured and recorded. The general phenomenology for such a test protocol is for the OCV to decay monotonically, but with a distinct "knee" or pronounced increase in the decay rate. The point at which the decay rate increases is taken as the lifetime of the MEA.

Examples 11 & 12C

For Example 11, 165 g of 0.65 cm cylindrical zirconium oxide milling media (Zircoa, Inc., Solon, Ohio) was placed in a 125 ml plastic bottle. To the milling media were added 30 g of n-propanol and 1.58 g of $MnO_2$. The mixture was rolled on a mill rack (U.S. Stoneware, East Palestine, Ohio) for 24 hours and then separated from the milling media. 200 g of an ionomer casting solution containing 23 wt % solids (i.e., 46 g of the ionomeric polymer, EW 1000) in 70:30 n-propanol/water was dispensed into a 250 ml plastic bottle. 1.66 g of the mixture of n-propanol and $MnO_2$ above was added to the ionomer casting solution with stirring. The quantities above yield an ionomer casting solution with 0.083 g of $MnO_2$, and thus 0.18 wt % $MnO_2$ in the dried ionomer film. Using the ionomer coating solution with $MnO_2$ added, a polymer membrane was cast according to the method described in U.S. patent application Ser. No. 09/837,771, filed Apr. 18, 2001, incorporated herein by reference.

For Example 12C, polymer membranes were cast as indicated for Example 11 using the same ionomer casting solution but without the added $MnO_2$.

MEA's were fabricated from the membranes according to the method described above for Examples 6 and 7C. The MEA's were tested according to the lifetime test described above for Examples 6 and 7C. The results are reported in Table 2.

TABLE 2

| Example | Lifetime (hours) |
|---------|------------------|
| 11      | 177              |
| 12C     | 59               |

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a fuel cell polymer electrolyte membrane comprising the steps of:
    a) providing a highly fluorinated polymer electrolyte comprising acidic functional groups;
    b) adding at least one manganese oxide to the highly fluorinated polymer electrolyte in an amount so as to provide between 0.01 and 5 percent of the total weight of said polymer electrolyte membrane; and
    c) thereafter forming a polymer electrolyte membrane comprising said polymer electrolyte, wherein the distribution of each manganese oxide across the thickness of said polymer electrolyte membrane is uniform.

2. A method of making a fuel cell membrane electrode assembly comprising the method according to claim 1, and additionally comprising the step of:
    d) forming a membrane electrode assembly comprising said polymer electrolyte membrane.

3. The method according to claim 1 wherein said highly fluorinated polymer electrolyte is perfluorinated.

4. The method according to claim 1 wherein said at least one manganese oxide provides between 0.1 and 1 percent of the total weight of said polymer electrolyte membrane.

5. The method according to claim 1 wherein said at least one manganese oxide provides between 0.2 and 0.3 percent of the total weight of said polymer electrolyte membrane.

6. The method according to claim 1 wherein said at least one manganese oxide is $MnO_2$.

7. The method according to claim 1 wherein said at least one manganese oxide is $Mn_2O_3$.

8. The method according to claim 1 wherein said polymer electrolyte has an equivalent weight of 1000 or less.

9. The method according to claim 1 wherein said polymer electrolyte has an equivalent weight of 900 or less.

10. The method according to claim 1 wherein said polymer electrolyte has an equivalent weight of 800 or less.

11. The method according to claim 1 wherein said polymer electrolyte comprises pendent groups according to the formula:

$$-O-CF_2-CF_2-CF_2-CF_2-SO_3H.$$

12. The method according to claim 1 wherein said polymer electrolyte comprises pendent groups according to the formula:

$$-O-CF_2-CF(CF_3)-O-CF_2-CF_2-SO_3H.$$

13. The method of claim 1, wherein the amount of at least one manganese oxide present in the polymer electrolyte membrane does not vary more than +/−50%.

14. The method of claim 13, wherein the amount of at least one manganese oxide present does not vary more than +/−20%.

* * * * *

UNITED STATES PATENT AND TRADEMARK OFFICE
CERTIFICATE OF CORRECTION

| | | |
|---|---|---|
| PATENT NO. | : 8,092,954 B2 | Page 1 of 1 |
| APPLICATION NO. | : 12/621795 | |
| DATED | : January 10, 2012 | |
| INVENTOR(S) | : Matthew H Frey | |

It is certified that error appears in the above-identified patent and that said Letters Patent is hereby corrected as shown below:

Column 2
Line 32, delete "$MnO_2O_3$." and insert -- $Mn_2O_3$. --, therefor.

Signed and Sealed this
Twentieth Day of March, 2012

David J. Kappos
*Director of the United States Patent and Trademark Office*